United States Patent
Gross et al.

(10) Patent No.: US 7,155,365 B1
(45) Date of Patent: Dec. 26, 2006

(54) OPTIMAL BANDWIDTH AND POWER UTILIZATION FOR AD HOC NETWORKS OF WIRELESS SMART SENSORS

(75) Inventors: Kenny C. Gross, San Diego, CA (US); Becky X. Li, Rowland Heights, CA (US); Keith A. Whisnant, La Jolla, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 11/195,565

(22) Filed: Aug. 2, 2005

(51) Int. Cl.
*G06F 7/02* (2006.01)
(52) U.S. Cl. .............. 702/179; 702/182; 702/183; 702/189
(58) Field of Classification Search ............ 702/116, 702/181–183, 185, 179, 189; 700/30; 709/102, 709/224; 714/26
See application file for complete search history.

(56) References Cited

U.S. PATENT DOCUMENTS

| 5,764,509 A | * | 6/1998 | Gross et al. ............. 700/29 |
| 2002/0178207 A1 | * | 11/2002 | McNeil ................. 709/102 |
| 2002/0183971 A1 | * | 12/2002 | Wegerich et al. .......... 702/185 |

* cited by examiner

*Primary Examiner*—Marc S. Hoff
*Assistant Examiner*—Felix Suarez
(74) *Attorney, Agent, or Firm*—Park, Vaughan & Fleming, LLP; Gilbert C. Wong

(57) ABSTRACT

A system that uses statistical techniques to selectively transmit sensor data which is likely to be of interest. During operation, the system uses statistical techniques to compute a likelihood that the sensor is observing a real event. Next, the system compares the likelihood to an upper threshold. If the likelihood is greater than or equal to the upper threshold, the system determines that the sensor is observing a real event and transmits sensor data for the real event to a receiver.

18 Claims, 2 Drawing Sheets

OPTIMAL BANDWIDTH AND POWER UTILIZATION FOR AD HOC NETWORKS OF WIRELESS SMART SENSORS

BACKGROUND

1. Field of the Invention

The present invention relates to techniques for gathering information from sensors. More specifically, the present invention relates to a method and apparatus that uses statistical techniques to determine if a sensor in an ad hoc network is observing an interesting event which is worthwhile to transmit across the ad hoc network.

2. Related Art

"Smart Motes" belong to class of integrated intelligent wireless sensors. These integrated intelligent wireless sensors typically include a number of components such as transducers, an operating system, and a central processing unit (CPU), which can preprocess sampled signals. Smart Motes are quite useful because they can be organized into geographically distributed ad hoc networks, which can measure a wide range of physical variables such as: temperature, vibration, humidity, barometric pressure, radiation level, light, sonar, etc.

FIG. 1 presents a block diagram of smart mote 100, which contains sensor 102, CPU 104, transmitter 106, and antenna 108. Sensor 102 monitors physical variables and sends the resulting signal to CPU 104 for pre-processing. Transmitter 106 transmits the pre-processed signal using antenna 108 to one or more remote receivers.

Many of the physical variables which are measured by Smart Motes are episodic in nature. Typically, there is some amount of normal background variation, which does not contain useful information. This background variation is interspersed with episodes of interesting events, which are characterized by elevated mean signal levels, increased burstiness, appearance of a trend or growth rate in variables that are otherwise statistically stationary, or appearance of dynamic phenomena that distinguish the interesting events from the normal background variation. For example, FIG. 2 illustrates a signal with background variations and a real event. Background signals 202 and 206 are caused by background variations, whereas signal 204 is a real event.

Although the Smart Motes can transmit data values continuously, doing so during uninteresting time periods wastes bandwidth and wastes battery power. One technique for using the bandwidth more effectively is to set thresholds for specific Smart Mote variables. If the measured level of a variable exceeds a threshold, the Smart Mote transmits the data. This threshold-limit technique suffers from two limitations:

1. It is difficult to decide where to set the threshold. For noisy processes, setting the threshold too low results in frequent "false-alarm" warnings. However, setting the threshold too high results in missing a real event.
2. The received data has gaps during the "uninteresting" times, but most pattern recognition techniques require uniformly sampled signals.

Hence, what is needed is a method and an apparatus for selectively transmitting data from a remote sensor, such as a Smart Mote.

SUMMARY

One embodiment of the present invention provides a system that uses statistical techniques to selectively transmit sensor data which is likely to be of interest. During operation, the system uses statistical techniques to compute a likelihood that the sensor is observing a real event. Next, the system compares the likelihood to an upper threshold. If the likelihood is greater than or equal to the upper threshold, the system determines that the sensor is observing a real event and transmits sensor data for the real event to a receiver.

In a variation on this embodiment, the system compares the likelihood to a lower threshold. If the likelihood is less than or equal to the lower threshold, the system determines that the sensor is observing background variations. If the likelihood is between the upper threshold and the lower threshold, the system determines that not enough information is available to determine whether the sensor is observing background variations or is observing a real event. In both cases, the system continues to monitor the sensor.

In a variation on this embodiment, while computing the likelihood, the system computes the probability that a null hypothesis test for the sensor is true based on a current sensor value and historical sensor values. Note that if the null hypothesis test is true, the sensor is observing background variations. The system also computes the probability that an alternative hypothesis test for the sensor is true based on the current sensor value and historical sensor values. Note that if the alternative hypothesis test is true, the sensor is observing a real event. The system then computes a ratio of the probability that the alternative hypothesis test for the sensor is true to the probability that the null hypothesis test for the sensor is true.

In a variation on this embodiment, the alternative hypothesis test can include: a positive mean test, which determines if the mean of a sensor signal is above a reference level; a negative mean test, which determines if the mean of the sensor signal is below a reference level; a nominal variance test; which determines if the variance of the sensor signal is proportional to a scale factor; a inverse variance test, which determines if the variance of the sensor signal is proportional to the inverse of the scale factor; a positive first-difference test, which determines if the sensor signal is increasing; and a negative first-difference test, which determines if the sensor signal is decreasing.

In a variation on this embodiment, the system uses the mean and the variance of a sensor signal computed during a training phase to normalize the mean and the variance of the sensor signal during a monitoring phase.

In a variation on this embodiment, when the sensor is not transmitting sensor data, the system generates synthetic observations at a receiver to fill gaps in data from the sensor.

In a variation on this embodiment, the sensor is located on a Smart Mote, which measures and preprocesses physical variables, and transmits the resulting data wirelessly to a receiver.

DETAILED DESCRIPTION

Figure 1:
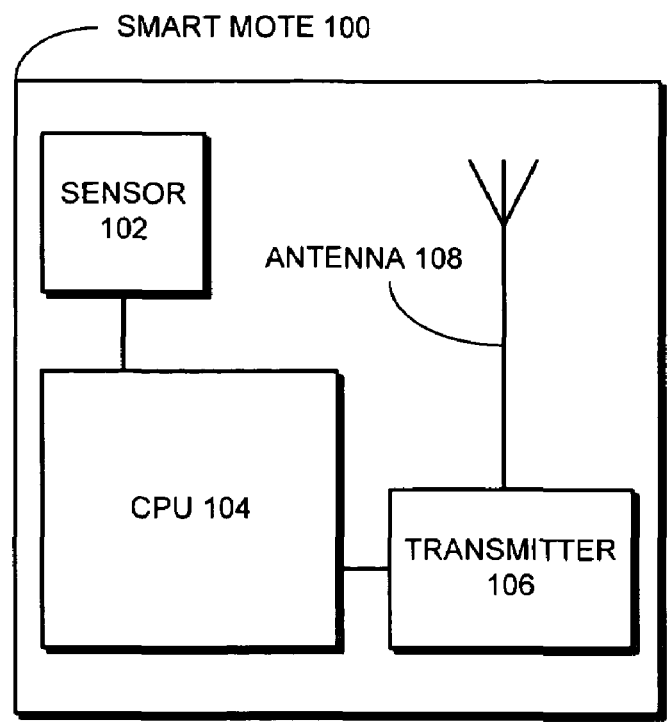
FIG. 1 presents a block diagram of a Smart Mote.
Figure 2:
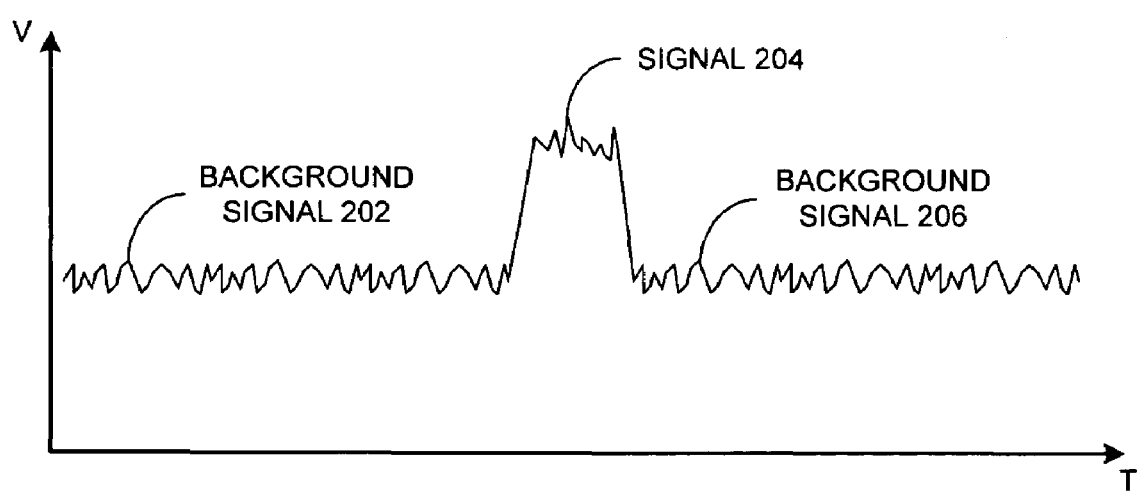
FIG. 2 illustrates a signal with background variations and a real event.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Transmitting Side

One embodiment of the present invention improves the operation of Smart Motes by it minimizing bandwidth used by the Smart Motes, minimizing battery power used by the Smart Motes, and eliminating gaps in data on the receiving end of transmission by the Smart Motes.

Instead of using a fixed threshold to decide when to transmit data, the present invention applies a sequential detection technique called the Sequential Probability Ratio Test (SPRT) to decide when the events monitored by the wireless sensors are "interesting." Note that the interesting events can include (1) a signal that comes from a distribution that has a higher or a lower mean than normal, or (2) a signal that has a larger or smaller level of variability than normal. Using a SPRT on the transmitting side has the following advantages:
1. The SPRT has user configurable false-alarm and missed-alarm probabilities (as opposed to threshold limits, which have a "seesaw" tradeoff between sensitivity and false alarms).
2. The SPRT has the mathematically shortest decision time for catching subtle anomalies in noisy process variables.

It is important to note that the SPRT is not compute intensive and is well-suited to operate on within the CPU constraints of the Smart Motes (the SPRT uses simple algebraic expressions).

Receiving Side

On the receiving side, during uninteresting times, large gaps in data can exist when the Smart Motes are not transmitting. The Smart Mote system generates synthetic observations adhering to a target distribution that has the same mean and variance as the parameter being monitored by the Smart Mote during the background activity time period for that variable. The distribution defaults to normal, Gaussian white noise. By definition, the data characteristics are less interesting during this time period, hence, a synthesis of background activity is adequate for pattern recognition algorithms that use the telemetry signals. In one embodiment of the present invention, the distribution for the expected background activity is not a Gaussian distribution.

SPRT Implementation

The Sequential Probability Ratio Test is a statistical hypothesis test that differs from standard fixed sample tests. In fixed-sample statistical tests, a given number of observations are used to select one hypothesis from one or more alternative hypotheses. The SPRT, however, examines one observation at a time, and then makes a decision as soon as it has sufficient information to ensure that pre-specified confidence bounds are met.

The basic approach taken by the SPRT technique is to analyze successive observations of a discrete process. Let $y_n$ represent a sample from the process at a given moment $t_n$ in time. In one embodiment of the present invention, the sequence of values $\{Y_n\}=y_0,y_1, \ldots, y_n$ comes from a stationary process characterized by a Gaussian, white-noise probability density function (PDF) with mean 0. (Note that since with the sequence is from a nominally stationary processes, any process variables with a nonzero mean can be first normalized to a mean of zero with no loss of generality).

The SPRT is a binary hypothesis test that analyzes process observations sequentially to determine whether or not the signal is consistent with normal behavior. When a SPRT reaches a decision about current process behavior (i.e. the signal is behaving normally or abnormally), the system reports the decision and continues to process observations.

For each of the six types of tandem SPRT tests described below, the signal data adheres to a Gaussian PDF with mean 0 and variance $\sigma^2$ for normal signal behavior, referred to as the null hypothesis, $H_0$. The system computes six specific SPRT hypothesis tests in parallel for the variable monitored by each wireless Smart Mote. One embodiment of the present invention applies a SPRT to a time-series with a Gaussian distribution. Another embodiment of the present invention applies a nonparametric SPRT to a time-series that does not adhere to a Gaussian distribution.

The SPRT surveillance module executes all 6 tandem hypothesis tests in parallel. Each test determines whether the current sequence of process observations is consistent with the null hypothesis versus an alternative hypothesis. The first four tests are the positive mean test, the negative mean test, the nominal variance test, and the inverse variance test. For the positive mean test, the signal data for the corresponding alternative hypothesis, $H_1$, adheres to a Gaussian PDF with mean +M and variance $\sigma^2$. For the negative mean test, the signal data for the corresponding alternative hypothesis, $H_2$, adheres to a Gaussian PDF with mean −M and variance $\sigma^2$. For the nominal variance test, the signal data for the corresponding alternative hypothesis, $H_3$, adheres to a Gaussian PDF with mean 0 and variance $V\sigma^2$ (with scalar factor V). For the inverse variance test, the signal data for the corresponding alternative hypothesis, $H_4$, adheres to a Gaussian PDF with mean 0 and variance $\sigma^2/V$.

The final two tandem SPRT tests are performed not on the raw Smart Mote output variables as above, but on the first difference function of the variable. For discrete time series, the first difference function (i.e. difference between each observation and the observation preceding it) gives an estimate of the numerical derivative of the time series. During uninteresting time periods, the observations in the first difference function are a nominally stationary random process centered about zero. If an upward or downward trend suddenly appears in the signal, SPRTs number 5 and 6 observe an increase or decrease, respectively, in the slope of the Smart Mote variable.

For example, if there is a decrease in the value of the variable, SPRT alarms are triggered for SPRTs 2 and 6. SPRT 2 generates a warning because the sequence of raw observations drops with time. And SPRT 6 generates a warning because the slope of the variable changes from zero to something less than zero. The advantage of monitoring the mean SPRT and slope SPRT in tandem is that the system correlates the SPRT readings from the six tests and determines if the signal is a real event. For example, if the signal levels off to a new stationary value (or plateau), the alarms from SPRT 6 cease because the slope returns to zero when the raw signal reaches a plateau. However, SPRT 2 will continue generating a warning because the new mean value of the signal is different from the value prior to the degradation. Therefore, the system correctly identifies a real event.

If SPRTs 3 or 4 generates a warning, the variance of the sensed variable is either increasing or decreasing, respectively. An increasing variance that is not accompanied by a change in mean (inferred from SPRTs 1 and 2 and SPRTs 5 and 6) signifies an episodic event that is "bursty" or "spiky" with time. A decreasing variance that is not accompanied by a change in mean is a common symptom of a failing sensor that is characterized by an increasing time constant. Therefore, having variance SPRTs available in parallel with slope and mean SPRTs provides a wealth of supplementary diagnostic information that has not been possible with conventional wireless sensors.

The SPRT technique provides a quantitative framework that permits a decision to be made between the null hypothesis and the six alternative hypotheses with specified misidentification probabilities. If the SPRT accepts one of the alternative hypotheses, an alarm flag is set and data is transmitted. If all six of the null hypotheses are met, it can be concluded with a high degree of confidence that the data represents normal background activity for the variable monitored by the Smart Mote.

The SPRT operates as follows. At each time step in a calculation, the system calculates a test index and compares it to two stopping boundaries A and B (defined below). The test index is equal to the natural log of a likelihood ratio ($L_n$), which for a given SPRT is the ratio of the probability that the alternative hypothesis for the test ($H_j$, where j is the appropriate subscript for the SPRT in question) is true, to the probability that the null hypothesis ($H_0$) is true.

$$L_n = \frac{\text{probability of observed sequence } \{Y_n\} \text{ given } H_j \text{ is true}}{\text{probability of observed sequence } \{Y_n\} \text{ given } H_0 \text{ is true}} \quad (1)$$

If the logarithm of the likelihood ratio is greater than or equal to the logarithm of the upper threshold limit [i.e., $\ln(L_n) > \ln(B)$], then the alternative hypothesis is true. If the logarithm of the likelihood ratio is less than or equal to the logarithm of the lower threshold limit [i.e., $\ln(L_n) < \ln(A)$], then the null hypothesis is true. If the log likelihood ratio falls between the two limits, [i.e., $\ln(A) < \ln(L_n) < \ln(B)$], then there is not enough information to make a decision (and, incidentally, no other statistical test could yet reach a decision with the same given Type I and II misidentification probabilities).

(2) relates the threshold limits to the misidentification probabilities $\alpha$ and $\beta$:

$$A = \frac{\beta}{1-\alpha}, B = \frac{1-\beta}{\alpha} \quad (2)$$

where $\alpha$ is the probability of accepting $H_j$ when $H_0$ is true (i.e., the false-alarm probability), and $\beta$ is the probability of accepting $H_0$ when $H_j$ is true (i.e., the missed-alarm probability).

The first two SPRT tests for normal distributions examine the mean of the process observations. If the distribution of observations exhibits a non-zero mean (e.g., a mean of either +M or −M, where M is the pre-assigned system disturbance magnitude for the mean test), the mean tests determine that the system is degraded. Assuming that the sequence $\{Y_n\}$ adheres to a Gaussian PDF, then the probability that the null hypothesis $H_0$ is true (i.e., mean 0 and variance $\sigma^2$) is:

$$P(y_1, y_2, \ldots, y_n | H_0) = \frac{1}{(2\pi\sigma^2)^{n/2}} \exp\left[-\frac{1}{2\sigma^2} \sum_{k=1}^{n} y_k^2\right] \quad (3)$$

Similarly, the probability for alternative hypothesis $H_1$ is true (i.e. mean M and variance $\sigma^2$) is:

$$P(y_1, y_2, \ldots, y_n | H_1) = \quad (4)$$

$$\frac{1}{(2\pi\sigma^2)^{n/2}} \exp\left[-\frac{1}{2\sigma^2}\left(\sum_{k=1}^{n} y_k^2 - 2\sum_{k=1}^{n} y_k M + \sum_{k=1}^{n} M^2\right)\right]$$

The ratio of the probabilities in (3) and (4) gives the likelihood ratio $L_n$ for the positive mean test:

$$L_n = \exp\left[-\frac{1}{2\sigma^2} \sum_{k=1}^{n} M(M - 2y_k)\right] \quad (5)$$

Taking the logarithm of likelihood ratio given by (5) produces the SPRT index for the positive mean test ($SPRT_{pos}$):

$$SPRT_{pos} = -\frac{1}{2\sigma^2} \sum_{k=1}^{n} M(M - 2y_k) = \frac{M}{\sigma^2} \sum_{k=1}^{n} \left(y_k - \frac{M}{2}\right) \quad (6)$$

The SPRT index for the negative mean test ($SPRT_{neg}$) is derived by substituting −M for each instance of M in (4) through (6) above, resulting in:

$$SPRT_{neg} = \frac{M}{\sigma^2} \sum_{k=1}^{n} \left(-y_k - \frac{M}{2}\right) \quad (7)$$

The remaining two SPRT tests examine the variance of the sequence. This capability gives the SPRT module the ability to detect and quantitatively characterize changes in variability for processes, which is vitally important for 6-sigma QA/QC improvement initiatives. In the variance tests, the system is degraded if the sequence exhibits a change in variance by a factor of V or 1/V, where V, the pre-assigned system disturbance magnitude for the variance test, is a positive scalar. The probability that the alternative hypothesis $H_3$ is true (i.e., mean 0 and variance $V\sigma^2$) is given by (3) with $\sigma^2$ replaced by $V\sigma^2$:

$$P(y_1, y_2, \ldots, y_n | H_0) = \frac{1}{(2\pi V\sigma^2)^{n/2}} \exp\left[-\frac{1}{2V\sigma^2} \sum_{k=1}^{n} y_k^2\right] \quad (8)$$

The likelihood ratio for the variance test is given by the ratio of (8) to (3):

$$L_n = V^{-n/2} \exp\left[-\frac{1}{2\sigma^2} \frac{1-V}{V} \sum_{k=1}^{n} y_k^2\right] \quad (9)$$

Taking the logarithm of the likelihood ratio given in (9) produces the SPRT index for the nominal variance test ($SPRT_{nom}$):

$$SPRT_{nom} = \frac{1}{2\sigma^2}\left(\frac{V-1}{V}\right)\sum_{k=1}^{n} y_k^2 - \frac{n}{2}\ln V \quad (10)$$

The SPRT index for the inverse variance test ($SPRT_{inv}$) is derived by substituting $1/V$ for each instance of $V$ in (8) through (10), resulting in:

$$SPRT_{inv} = \frac{1}{2\sigma^2}(1-V)\sum_{k=1}^{n} y_k^2 + \frac{n}{2}\ln V \quad (11)$$

The tandem SPRT module performs mean, variance, and SPRT tests on the raw process signal and on its first difference function. To initialize the module for analysis of a time-series for a Smart Mote variable, the user specifies the system disturbance magnitudes for the tests (M and V), the false-alarm probability ($\alpha$), and the missed-alarm probability ($\beta$).

Then, during the training phase (before the first failure of a component under test), the module calculates the mean and variance of the monitored variable process signal. For most monitored variables the mean of the raw observations for the variable will be nonzero; in this case the mean calculated from the training phase is used to normalize the signal during the monitoring phase. The system disturbance magnitude for the mean tests specifies the number of standard deviations (or fractions thereof) that the distribution must shift in the positive or negative direction to trigger an alarm. The system disturbance magnitude for the variance tests specifies the fractional change of the variance necessary to trigger an alarm.

At the beginning of the monitoring phase, the system sets all six SPRT indices to 0. Then, during each time step of the calculation, the system updates the SPRT indices using (6), (7), (10), and (11). The system compares each SPRT index is then compared to the upper [i.e., $\ln((1-\beta)/\alpha]$ and lower [i.e., $\ln(\beta/(1-\alpha))$] decision boundaries, with these three possible outcomes:

1. The lower limit is reached, in which case the process is declared healthy, the test statistic is reset to zero, and sampling continues.
2. The upper limit is reached, in which case the process is declared degraded, an alarm flag is raised indicating a sensor or process fault, the test statistic is reset to zero, and sampling continues.
3. Neither limit has been reached, in which case no decision concerning the process can yet be made, and the sampling continues.

The advantages of using a SPRT are twofold:
1. Early detection of very subtle anomalies in noisy process variables.
2. Pre-specification of quantitative false-alarm and missed-alarm probabilities.

The present invention uses tandem SPRTs to monitor "derivative SPRTs" in parallel with mean and variance SPRTs that are performed on the time series associated with the Smart Mote measured variable. The new tandem-SPRT approach facilitates determining the onset of interesting episodic events, saving both bandwidth and transmitter battery power during periods of normal background activity. During periods of normal background activity, the receiver agent generates synthesized observations that possess the same mean and variance as the original variable during its background activity period. Note that in addition to generating Gaussian data, they system can generate data which matches an empirical distribution.

Output from this invention may then be processed with standard pattern recognition algorithms that expect uniform, synchronous time series as input.

Identifying Real Events

Figure 3:
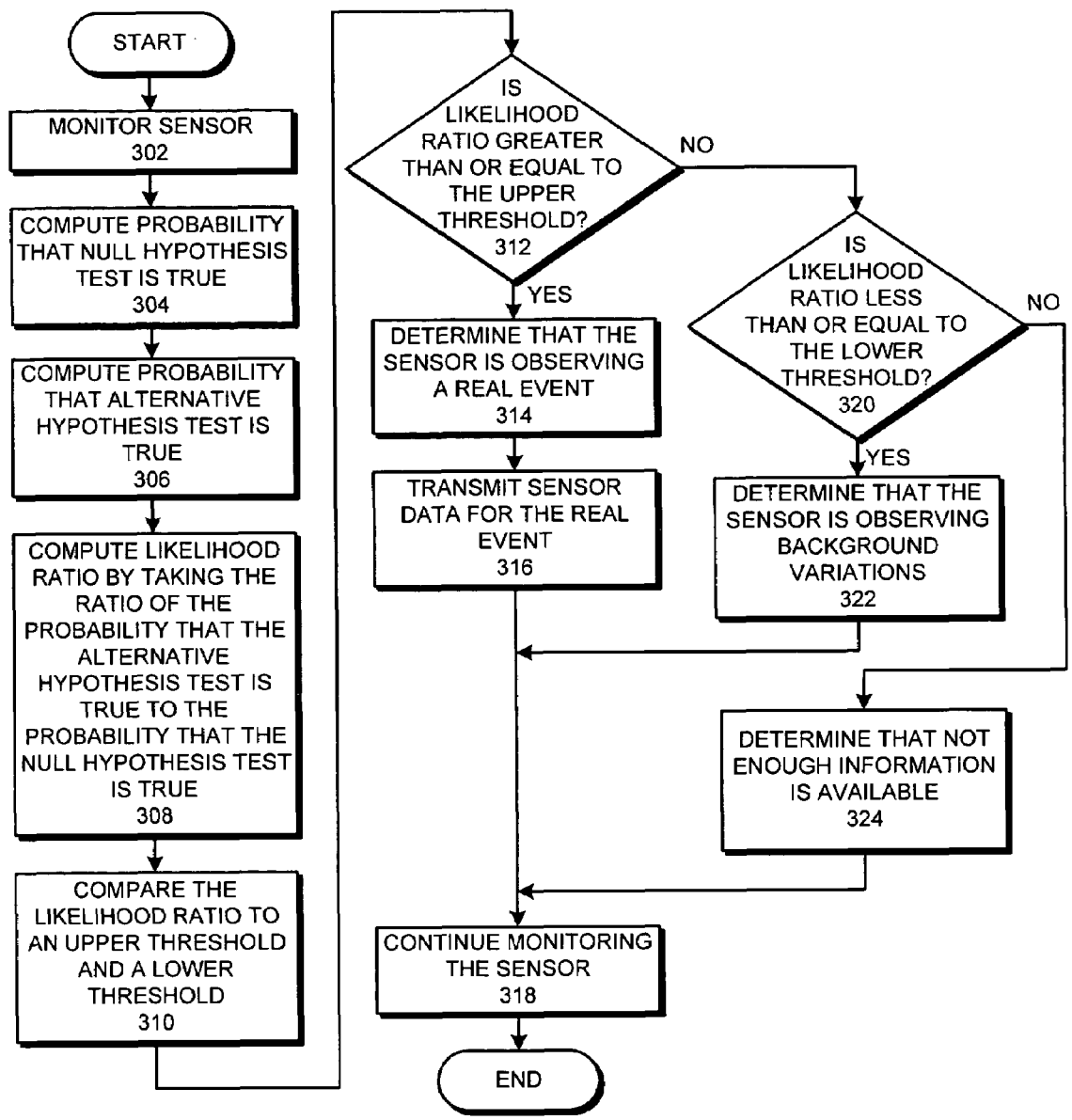
FIG. 3 presents a flow chart illustrating the process of determining if a sensor is observing a real event in accordance with an embodiment of the present invention.

FIG. 3 presents a flow chart illustrating the process of determining if a sensor is observing a real event in accordance with an embodiment of the present invention. During operation, the system monitors a sensor (step 302). Next, the system computes a probability that the null hypothesis test is true (step 304) and computes the probability that an alternative hypothesis test is true (step 306). The system then computes a likelihood ratio by taking the ratio of the probability that the alternative hypothesis test is true to the probability that the null hypothesis tests is true (step 308).

Next, the system compares the likelihood ratio to an upper threshold and a lower threshold (step 310). If the likelihood ratio is greater than or equal to the upper threshold (step 312), the system determines that the sensor is observing a real event (step 314) and transmits sensor data for the real event to a receiver (step 316). The system then continues monitoring the sensor (step 318).

If the likelihood ratio is less than or equal to the lower threshold, the system determines that the sensor is observing background variations (step 322) and continues monitoring the sensor (step 318). Otherwise, the system determines that not enough information is available (step 324) and continues monitoring the sensor (step 318).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for using statistical techniques to selectively transmit data from a sensor that is likely to be of interest, comprising:

using statistical techniques to compute a likelihood that the sensor is observing a real event, wherein computing the likelihood that the sensor is observing a real event involves:
  computing the probability that a null hypothesis test for the sensor is true based on a current sensor value and historical sensor values, wherein if the null hypothesis test is true, the sensor is observing background variations;
  computing the probability that an alternative hypothesis test for the sensor is true based on the current sensor value and historical sensor values, wherein if the alternative hypothesis test is true, the sensor is observing a real event, and wherein the alternative hypothesis test can include:
    a positive first-difference test, which determines if the sensor signal is increasing; and
    a negative first-difference test, which determines if the sensor signal is decreasing; and
  computing a ratio of the probability that the alternative hypothesis test for the sensor is true to the probability that the null hypothesis test for the sensor is true; and
comparing the likelihood to an upper threshold;
if the likelihood is greater than or equal to the upper threshold,
  determining that the sensor is observing a real event, and
  transmitting sensor data for the real event to a receiver.

2. The method of claim 1, wherein the method further comprises:
  comparing the likelihood to a lower threshold;
  if the likelihood is less than or equal to the lower threshold, determining that the sensor is observing background variations;
  if the likelihood is between the upper threshold and the lower threshold, determining that not enough information is available to determine whether the sensor is observing background variations or is observing a real event; and
  continuing to monitor the sensor.

3. The method of claim 1, wherein the alternative hypothesis test can further include:
  a positive mean test, which determines if the mean of a sensor signal is above a reference level;
  a negative mean test, which determines if the mean of the sensor signal is below a reference level;
  a nominal variance test; which determines if the variance of the sensor signal is proportional to a scale factor; and
  a inverse variance test, which determines if the variance of the sensor signal is proportional to the inverse of the scale factor.

4. The method of claim 1, wherein the method further comprises using the mean and the variance of a sensor signal computed during a training phase to normalize the mean and the variance of the sensor signal during a monitoring phase.

5. The method of claim 1, wherein when the sensor is not transmitting sensor data, the method further comprises generating synthetic observations at a receiver to fill gaps in data from the sensor.

6. The method of claim 1, wherein the sensor is located on a Smart Mote, which measures and preprocesses physical variables, and transmits the resulting data wirelessly to a receiver.

7. An apparatus that uses statistical techniques to selectively transmit data from a sensor that is likely to be of interest, comprising:
  a central processing unit;
  a transmitter;
  a receiver;
  sensor; and
  a transmission mechanism;
  wherein the transmission mechanism is configured to:
    use statistical techniques to compute a likelihood that the sensor is observing a real event, wherein while computing the likelihood, the transmission mechanism is configured to:
      compute the probability that a null hypothesis test for the sensor is true based on a current sensor value and historical sensor values, wherein if the null hypothesis test is true, the sensor is observing background variations;
      compute the probability that an alternative hypothesis test for the sensor is true based on the current sensor value and historical sensor values, wherein if the alternative hypothesis test is true, the sensor is observing a real event, and wherein the alternative hypothesis test can include:
        a positive first-difference test which determines if the sensor signal is increasing; and
        a negative first-difference test, which determines if the sensor signal is decreasing; and to
      compute a ratio of the probability that the alternative hypothesis test for the sensor is true to the probability that the null hypothesis test for the sensor is true; and
    compare the likelihood to an upper threshold;
    if the likelihood is greater than or equal to the upper threshold, to
      determine that the sensor is observing a real event, and to
      transmit sensor data for the real event to the receiver.

8. The apparatus of claim 7, wherein the transmission mechanism is additionally configured to:
  compare the likelihood to a lower threshold;
  if the likelihood is less than or equal to the lower threshold, to determine that the sensor is observing background variations;
  if the likelihood is between the upper threshold and the lower threshold, to determine that not enough information is available to determine whether the sensor is observing background variations or is observing a real event; and to
  continue to monitor the sensor.

9. The apparatus of claim 7, wherein the alternative hypothesis test can further include:
  a positive mean test, which determines if the mean of a sensor signal is above a reference level;
  a negative mean test, which determines if the mean of the sensor signal is below a reference level;
  a nominal variance test; which determines if the variance of the sensor signal is proportional to a scale factor; and
  a inverse variance test, which determines if the variance of the sensor signal is proportional to the inverse of the scale factor.

10. The apparatus of claim 7, wherein the transmission mechanism is additionally configured to use the mean and the variance of a sensor signal computed during a training phase to normalize the mean and the variance of the sensor signal during a monitoring phase.

11. The apparatus of claim 7, wherein when the sensor is not transmitting sensor data, the receiver is configured to generate synthetic observations to fill gaps in data transmitted from the sensor.

12. The apparatus of claim 7, wherein the sensor is located on a Smart Mote, which measures and preprocesses physical variables, and transmits the resulting data wirelessly to a receiver.

13. A computer system that uses statistical techniques to selectively transmit data from a sensor that is likely to be of interest, comprising:
- a central processing unit;
- a transmitter;
- a receiver;
- a sensor; and
- a transmission mechanism;

wherein the transmission mechanism is configured to:
- use statistical techniques to compute a likelihood that the sensor is observing a real event, wherein while computing the likelihood, the transmission mechanism is configured to:
  - compute the probability that a null hypothesis test for the sensor is true based on a current sensor value and historical sensor values, wherein if the null hypothesis test is true, the sensor is observing background variations;
  - compute the probability that an alternative hypothesis test for the sensor is true based on the current sensor value and historical sensor values, wherein if the alternative hypothesis test is true, the sensor is observing a real event, and wherein the alternative hypothesis test can include:
    - a positive first-difference test, which determines if the sensor signal is increasing; and
    - a negative first-difference test, which determines if the sensor signal is decreasing; and to
  - compute a ratio of the probability that the alternative hypothesis test for the sensor is true to the probability that the null hypothesis test for the sensor is true; and
- compute a likelihood based on the probability that the sensor is observing background variations and the probability that the sensor is observing a real event;
- compare the likelihood to an upper threshold;
- if the likelihood is greater than or equal to the upper threshold, to
  - determine that the sensor is observing a real event, and to
  - transmit sensor data for the real event to the receiver.

14. The computer system of claim 13, wherein the transmission mechanism is additionally configured to:
- compare the likelihood to a lower threshold;
- if the likelihood is less than or equal to the lower threshold, to determine that the sensor is observing background variations;
- if the likelihood is between the upper threshold and the lower threshold, to determine that not enough information is available to determine whether the sensor is observing background variations or is observing a real event; and to
- continue to monitor the sensor.

15. The computer system of claim 13, wherein the alternative hypothesis test can further include:
- a positive mean test, which determines if the mean of a sensor signal is above a reference level;
- a negative mean test, which determines if the mean of the sensor signal is below a reference level;
- a nominal variance test; which determines if the variance of the sensor signal is proportional to a scale factor; and
- a inverse variance test, which determines if the variance of the sensor signal is proportional to the inverse of the scale factor.

16. The computer system of claim 13, wherein the transmission mechanism is additionally configured to use the mean and the variance of a sensor signal computed during a training phase to normalize the mean and the variance of the sensor signal during a monitoring phase.

17. The computer system of claim 13, wherein when the sensor is not transmitting sensor data, the receiver is configured to generate synthetic observations to fill gaps in data transmitted from the sensor.

18. The computer system of claim 13, wherein the sensor is located on a Smart Mote, which measures and preprocesses physical variables, and transmits the resulting data wirelessly to a receiver.

* * * * *